United States Patent [19]

Tzou

[11] Patent Number: 4,776,030

[45] Date of Patent: Oct. 4, 1988

[54] BLOCK QUANTIZER FOR TRANSFORM CODING

[75] Inventor: Kou-Hu Tzou, Bedford, Mass.

[73] Assignee: GTE Laboratories Incorporated, Waltham, Mass.

[21] Appl. No.: 845,644

[22] Filed: Mar. 28, 1986

[51] Int. Cl.[4] ............................................. G06K 9/46
[52] U.S. Cl. ..................................... 382/56; 358/260
[58] Field of Search ................. 358/260, 133; 382/56, 382/39, 43; 364/725; 375/26

[56] References Cited

U.S. PATENT DOCUMENTS

| | | | |
|---|---|---|---|
| 4,196,448 | 4/1980 | Whitehouse | 364/725 |
| 4,200,886 | 4/1980 | Musmann | 358/260 |
| 4,225,885 | 9/1980 | Lux | 382/56 |
| 4,385,393 | 5/1983 | Chaure | 375/26 |
| 4,386,366 | 5/1983 | Mori | 358/260 |
| 4,398,217 | 8/1983 | Peters | 382/56 |
| 4,513,426 | 4/1985 | Jayant | 375/26 |
| 4,581,638 | 4/1986 | Chiariglione | 358/260 |
| 4,677,479 | 6/1987 | Hatori | 358/135 |

OTHER PUBLICATIONS

Anil K. Jain, "Image Data Compression: A Review," *Proceedings of the IEEE*, vol. 69, No. 3, Mar. 1981.

K. N. Ngan, "Adaptive Transform Coding of Video Signals," *IEE Proc.*, vol. 129 Pt. F, No. 1, Feb. 1982.

Arun N. Netravali and John O. Limb, "Picture Coding: A Review," *Proceedings of the IEEE*, vol. 68, No. 3, Mar. 1980.

Paul A. Wintz, "Transform Picture Coding," *Proceedings of the IEEE*, vol. 60, No. 7, Jul. 1972.

*Primary Examiner*—Leo H. Boudreau
*Assistant Examiner*—A. Anne Skinner
*Attorney, Agent, or Firm*—Hamilton, Brook, Smith & Reynolds

[57] ABSTRACT

In a two-dimensional transform coding system, the transform coefficients are ordered according to the variance of the coefficients through a frame of coefficient blocks. Quantization bits are individually assigned to maximize the reduction in quantization error with each assignment. The coefficients are grouped according to the number of quantization bits assigned thereto. To assign each bit, the reduction in quantization error of the frame of the block is computed for the coefficient having the largest variance of each group as the product of the square of the variance and the normalized change in quantization error. The normalized change in quantization error may be stored in a lookup table as a function of the type of distribution of the coefficients.

20 Claims, 5 Drawing Sheets

BLOCK QUANTIZER FOR TRANSFORM CODING

BACKGROUND

Due to the advantages of digital transmission in telecommunications and the flexibility of signal processing by digital circuitry, digital images are preferred in various applications. However, the transmission of images in digital format needs much more bandwidth than transmission of analog waveforms. In order to reduce the transmission rate for digital images, various image compression techniques have been developed. Among them, transform coding has been proven to be an efficient means of image compression.

In a typical transform image coding system, an image is segmented into blocks of equal size as illustrated in FIG. 1. In the illustration of FIG. 1, an image frame is divided into 5×5 blocks, each of which includes 4×4=$N^2$ picture elements (pixels). Within each block, the coefficients can be identified by the rectangular coordinates i,j. A small number of blocks and picture elements are used for purposes of illustration, but a more typical system would include 8×8 or 16×16 pixel blocks to complete a frame of 512×512 pixels.

A two-dimensional transform is applied to each block, and a block coder is then used to encode the transform coefficients. The decoding system is just a reverse procedure corresponding to the encoding. Various transforms have been studied for image coding applications. Among them, the Discrete Cosine Transform (DCT) is found to be the best from the combined standpoint of performance and computational efficiency.

With a discrete cosine transform an N×N array of coefficients results from the transform of an N×N block of pixels. With a discrete Fourier transform a lesser number of complex coefficients would be obtained. Because natural images tend to have smooth transitions, the coefficients tend to be greater in magnitude toward the lower frequencies, that is toward i, j=0, 0. For that reason, more efficient use of bits is made by allocating a greater number of bits to the lower frequency coefficients during quantization. A typical allocation of bits $b_{i,j}$ is shown in FIG. 1.

The most crucial task in designing a transform image coding system is in designing a block quantizer to encode the two-dimensional transform coefficients. For nonadaptive types of coding, a zonal coding strategy that uses a fixed block quantizer might allocate the bits as, for example, shown in FIG. 1. Basically, this type of block quantizer is designed according to the rate derived from the rate-distortion theory. For Gaussian sources with the mean squared error (MSE) distortion measure, the optimal rate or number of bits, $R_{i,j}(D)$, for the (i,j)th transform coefficient is found to be $$R_{i,j}(D) = \begin{cases} \frac{1}{2} \log \sigma_{i,j}^2/D & \sigma_{i,j}^2 > D \\ 0 & \sigma_{i,j}^2 \leq D \end{cases} \quad (1)$$

where $\sigma_{i,j}$ is the variance of the (i,j)th transform coefficient through the frame and D is the desired average mean squared error. For most non-Gaussian sources, the optimal rate could not be found from the rate-distortion theory. Actually, there have been no known practical methods to achieve the minimum mean squared error, even for Gaussian sources. Instead, the rate $R_{i,j}(D)$ in equation (1) is rounded to its closest integer $[R_{i,j}(D)]$, and an $[R_{i,j}(D)]$-bit optimal quantizer is used to encode the transform coefficient. The optimality of the rate-distortion block quantizer is lost by this rounding. Further, a study recently showed that the distribution of AC coefficients of the DCT is not Gaussian. Instead, it is closer to a Laplacian distribution.

In another approach the allocation of bits is determined for each frame by computing, for each bit to be assigned to a block of coefficients, the change in quantization error which would result by assignment of that bit to each of the coefficients. Each bit is then assigned to the coefficient which provides for the greatest reduction in quantization error. A. K. Jain, "Image Data Compression: A Review" *Proceedings of the IEEE*, Volume 69, Number 3, March, 1981, Pages 349–388, at 365. The Jain approach requires extensive computations.

SUMMARY OF THE INVENTION

In an adaptive system, discrete coefficients in a block of coefficients are quantized with different numbers of quantization bits per coefficient. Corresponding coefficients in each block are quantized with a like number of bits. To allocate the bits, the coefficients are ordered according to the variance of the coefficients through a frame of a plurality of blocks. (Because variance is the square of standard deviation, ordering by standard deviation would also order by variance.) Each quantization bit is then assigned to a coefficient and the coefficients are grouped according to the number of thus assigned bits. The bits are assigned by determining, for each of the plurality of quantization bits per block, the reduction in the quantization error of the frame of blocks with assignment of the quantization bit to the coefficient of each bit group having the largest variance. The determined quantization errors are then compared and the bit is assigned to the coefficient for which the largest reduction in quantization error is obtained. The coefficients of each block throughout the frame are then quantized with the assigned number of bits.

The system has been developed for quantizing the coefficients resulting from a two dimensional transform of blocks of image data. Preferably, the change in quantization error is computed for each coefficient from the variance of that coefficient through the frame and a normalized change in quantization error for the particular bit being added. The normalized change in quantization error can typically be defined for each bit group based on the distribution of the incoming signal and the nature of the quantizer to be used. The normalized reductions in quantization error can be stored in tables for known distributions such as the Gaussian and Laplacian.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
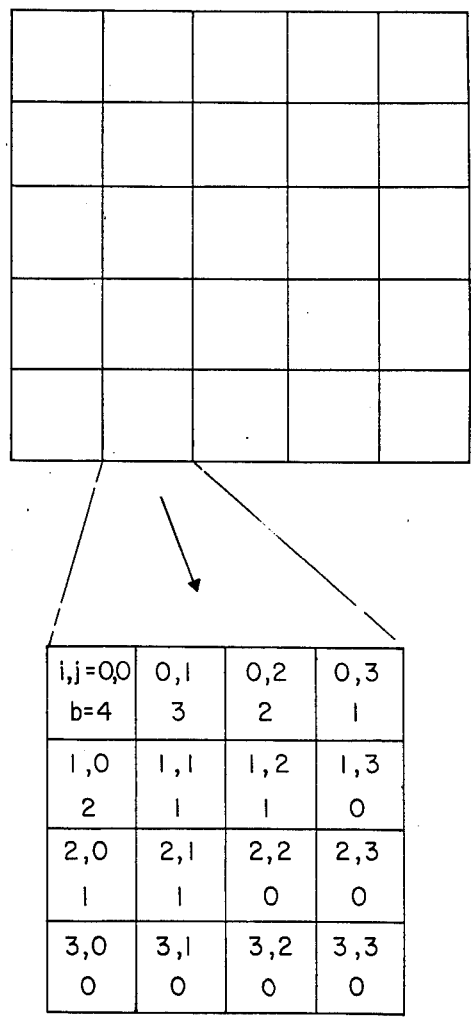
FIG. 1 is an illustration of an image display organized in 5×5 blocks, each of 4×4 pixels.

The present invention is based on the concept that each bit to be allocated to a block of coefficients is best allocated to that coefficient which provides for the greatest reduction in quantization error with the addition of that bit. For example, once three bits have been allocated in a block, the fourth bit should be allocated to that coefficient for which there will be the greatest reduction in quantization error. If the two dimensional array of $N \times N$ coefficients are mapped into a one dimensional array of $N^2$ coefficients, the mean square error E which must be minimized is given as:

$$E = \sum_{k=1}^{N^2} \sigma_k^2 E(b_k) \quad (2)$$

within a fixed total bit number constraint $$B = \sum_{k=1}^{N^2} b_k$$

where $\sigma^2$ is the variance of each coefficient through the frame, $b_k$ is the number of bits assigned to each coefficient k within each block and $E(b_k)$ is the normalized quantization error for each particular $b_k$-bit quantizer. $E(b_k)$ is directly and explicitly related to the distribution of the coefficients being encoded and the type of quantizer used, and the quantizer can be either uniform or nonuniform. In the case of DCT image coding, the AC terms of the transform coefficients have a distribution close to the Laplacian and the DC term has a distribution close to the Gaussian.

The reduction $\Delta E_k$ in mean square error by allocating another bit for coefficient k is $$\Delta E_k = \sigma_k^2 [E(b_k) - E(b_k+1)] = \sigma_k^2 \Delta E(b_k) \quad (3)$$

The design rule is to assign an available bit to the coefficient k that provides the largest $\Delta E_k$. Nevertheless, the computation of $\Delta E_k$ and the comparison for choosing the largest $\Delta E_k$ does not have to be carried out over all coefficients k. With a given number of bits previously allocated to several coefficients, $[E(b_k) - E(b_k+1)]$ is equal for all coefficients. Therefore, the greatest reduction in mean square error $\Delta E_k$ will result by allocating the bit to the coefficient having the greatest variance.

Identification of the coefficient having the greatest variance is facilitated by initially listing the coefficient variance by order of magnitude. Initially, a single bit is allocated to the coefficient having the greatest variance. Thereafter, the coefficients are grouped according to the number of bits allocated thereto and within each group the variances are ordered according to the magnitude thereof. To allocate each additional bit, a computation is made according to equation 3 of the change in mean square error which would occur if the bit were allocated to the coefficient having the largest variance in each group. The computed mean square error reduction from each group then determines the coefficient to which the bit is to be allocated, and that coefficient is moved to the group of one additional bit.

Therefore, if an extra bt were allocated to Group $G_b$, where b is the number of bits previously allocated, the bit should be assigned to the group's first element, that is, that having the largest variance. The comparisons that have to be carried out become those of comparing the $\Delta E$s corresponding to the first elements of each of these groups. The design procedure of the bit map for an $N \times N$ transform with b bits assigned to each coefficient of each group can be summarized as follows:

Step 1. Initialize variables. Set $G_o = \{\sigma_1^2, \sigma_2^2 \ldots, \sigma_k^2 \ldots \sigma_{NXN}^2\}$ $G_b$ = Empty for $b \geq 1$. Set counter Ncnt = 0.

Step 2. If Ncnt = total bits allocated to the $N \times N$ block, then go to END.

Step 3. Calculate $\Delta E$ corresponding to the first element of each group.

Step 4. Assign a bit to the first element of Group $G_b$ with the largest $\Delta E$, and move that element to Group $G_{b+1}$.

Step 5. Increment counter, i.e. Ncnt = Ncnt + 1.

Go to Step 2.

Figure 2:
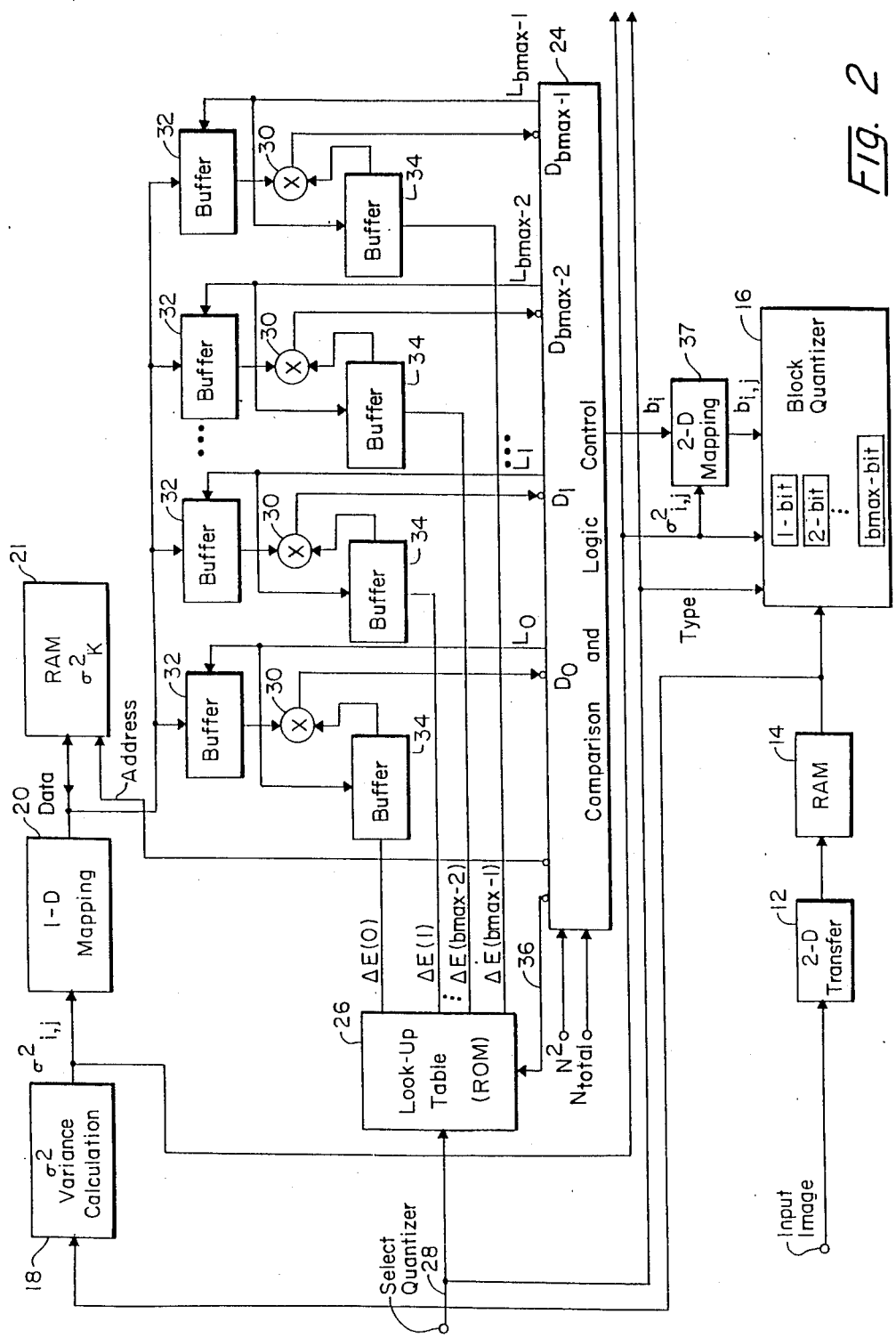
FIG. 2 is a block diagram of an encoder embodying the present invetion.

A system for implementing the above approach is illustrated in FIG. 2. A sequence of pixels for an image frame are applied to a two dimensional transform 12 such as a DCT. In the transform the image is divided into blocks as illustrated in FIG. 1, and a two dimensional transform is computed for each block to generate a set of coefficients U(i,j) for each block. The thus generated coefficients are stored in a RAM 14. The coefficients are used to determine an allocation of bits within each block which is applied across the entire frame. Once that allocation of bits is obtained, the coefficients are applied through a block quantizer 16 and quantized to the assigned number of bits. The block quantizer 16 may use scalar quantizers of any available type. For example, the optimal uniform and nonuniform quantizers proposed by J. Max may be used. J. Max, "Quantizing for Minimum Distortion", *IRE Trans. Information Theory*, 6, 7-12, (1960).

To determine the allocation of bits for the frame, the variance $\sigma_{i,j}^2$ is computed at 18 for all coefficients i, j of the frame. In the system illustrated in FIG. 1, for example, 16 variances would be computed. Those variances are then ordered according to magnitude in a one dimensional mapping unit 20 and stored in a RAM 21. In a comparison and logic control 24, pointers are generated and stored for grouping the variances according to the number of bits assigned thereto. Initially all variances are assigned to a first group $G_0$.

In order to compute the reduction in mean square error with the allocation of each bit, the nature of the distribution of the incoming signal must be determined. For example, the DCT of a natural image has a distribution closer to the Gaussian distribution at DC and a distribution closer to the Laplacian distribution at AC. When the logic control determines that the $\sigma_k^2$ corresponding to $\sigma_{i,j}^2 = \sigma_{0,0}^2$ is being considered, a $\Delta E$ based on a Gaussian distribution would be obtained. Otherwise, a $\Delta E(b)$ based on a Laplacian distribution would be required.

E is also dependent on the group $G_b$ being considered.

A precalculated table of $\Delta E(b)$ based on the type of qualtizers in the block quantizer 16 being used can be provided in a ROM 26 for each type of distribution. Different tables may also be stored for different types of quantizers in the block quantizer 16 which may be used in the system. Each table would include a different value of ΔE(b) for each group $G_b$. A particular table of ΔE(b) is selected by a signal 28 based on the known type of quantizer and the known distribution of the incoming signal. Alternatively, in a more complex system, the ΔE(b) might be calculated for each sequence of frames. Typically, the distribution is constant throughout an image sequence.

The system further includes a set of multipliers 30, each of which is associated with a bit group $G_b$. The multipliers are used to calculate the product of the largest variance of each bit group with the normalized change in quantization error ΔE of that bit group. The variances are addressed from the RAM 21 and latched into buffers 32 by the comparison and logic control 24. The changes in quantization error from the table 26 selected by the select signal 28 are latched into buffers 34. Alternative tables can be selected by the comparison and logic control 24 by means of signal 36 when, for example, the variance being multiplied is associated with the DC term which has a Gaussian distribution.

The logic control 24 selects the appropriate ΔE(b) for multiplication with each largest $\sigma_k^2$ obtained from each group $G_b$. The products obtained from multipliers 30 are compared to determine the largest reduction in mean square error. The $\sigma_k^2$ which provides the largest reduction in error is shifted to the next larger group and held as the smallest $\sigma_k^2$ of that group. All other variances are retained in their respective groups. The system has a maximum number of bits bmax into which a coefficient may be quantized and the variances of corresponding groups $G_{bmax}$ may not be used in the comparison. The multiplications and comparisons continue until all bits designated for a block have been allocated. Thereafter, the bits $b_k$ are mapped to the two dimensions i,j of the coefficients in 2-D map 37 and each coefficient of each block is quantized according to the assigned bit allocation.

Figure 3:
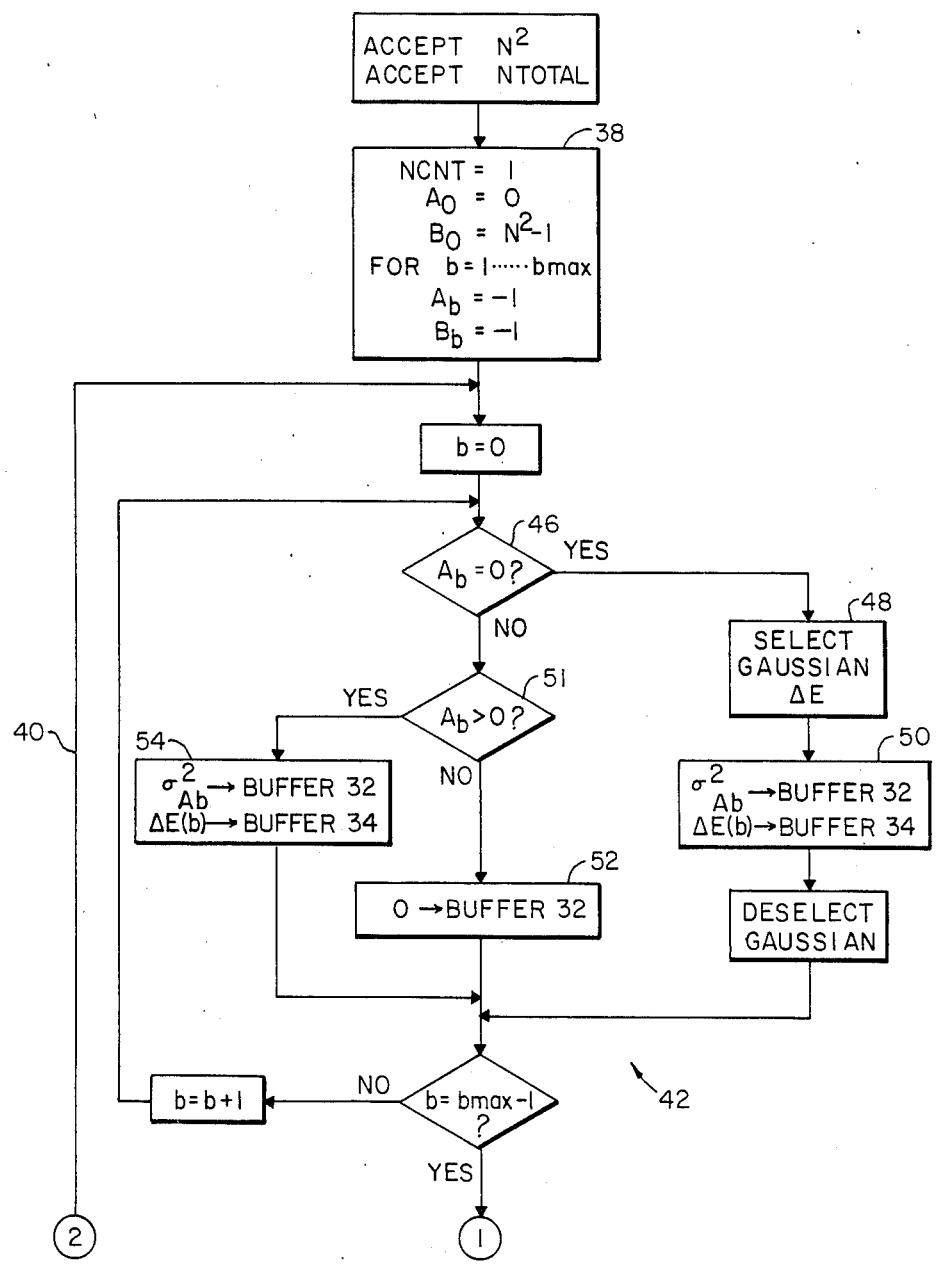
FIG. 3 is a flow chart of the comparison and logic control of FIG. 2.
Figure 3:
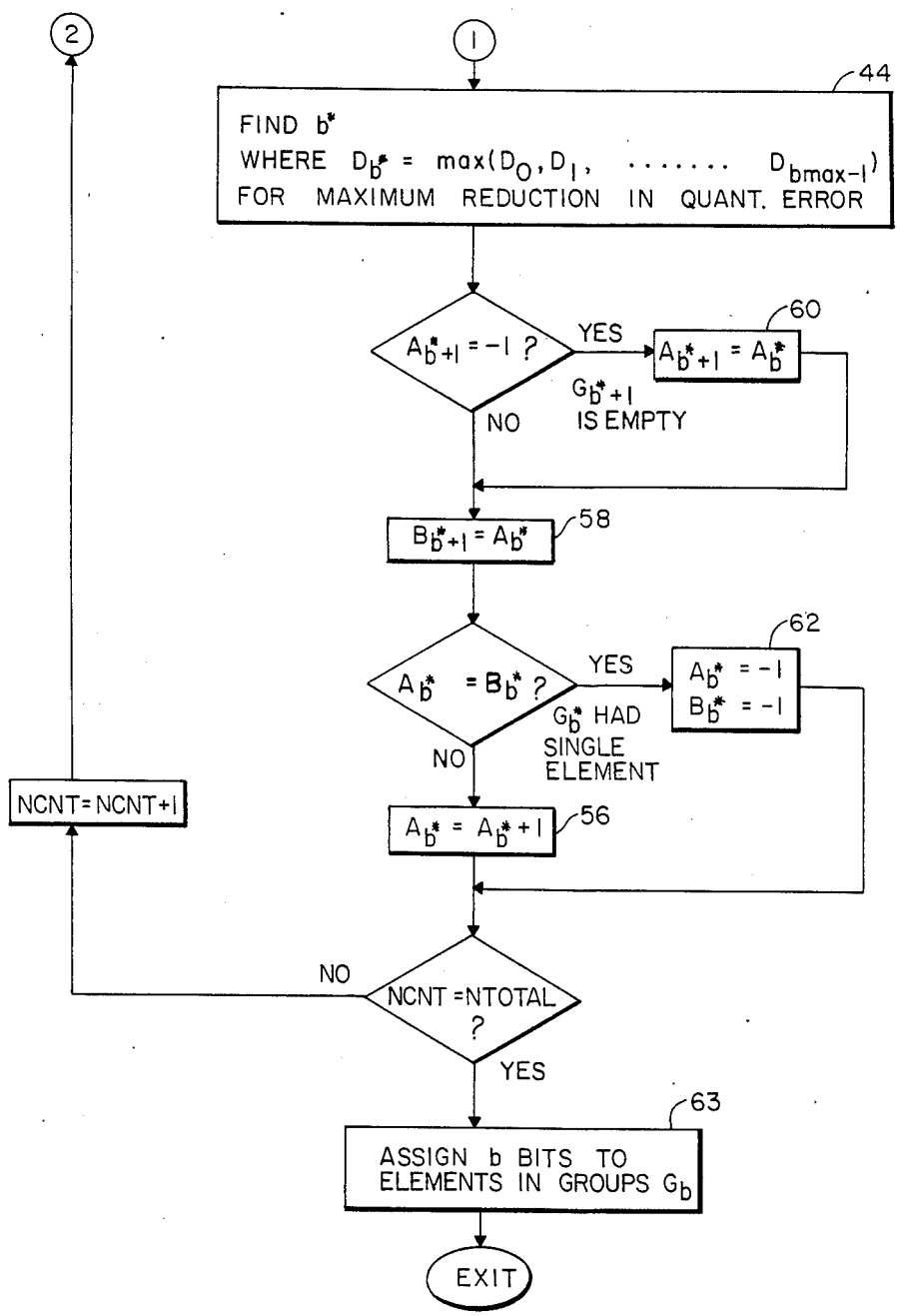
Figure 4:
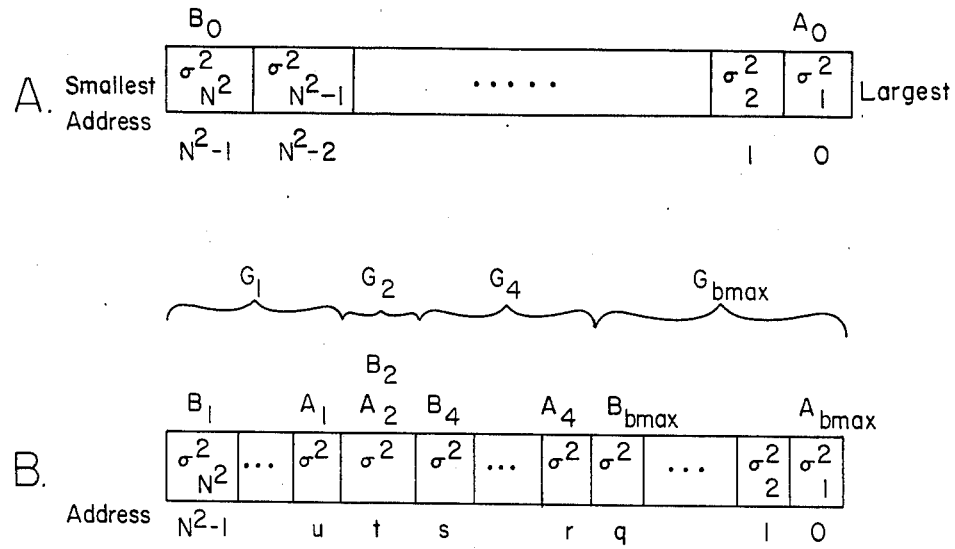
FIG. 4 illustrates the use of pointers to group variances in the system of FIGS. 2 and 3.

Operation of the comparison and logic controller 24 is illustrated by the flow chart of FIG. 3 and the illustrations of FIG. 4. Throughout the sequence, the variances are stored in addresses 0 to $N^2-1$ with the largest variance stored at address 0 and the smallest at address $N^2-1$. The variances are grouped by two pointers $A_b$ and $B_b$ for each group. $A_b$ indicates the largest variance of the group and $B_b$ indicates the smallest variance of the group. The addresses are stored in registers in the comparison logic and control 24. Initially, all variances are assigned zero bits and are thus included in group $G_0$. This is indicated by $A_0$ equal to 0 $B_0$ equal to $N^2-1$ as illustrated in FIG. 4A, and those variables are initialized in Block 38 of FIG. 3. The other groups are initially empty and this is indicated by setting $A_b$ and $B_b$ each equal to $-1$.

Each bit to a total number of bits Ntotal is then assigned to a respective group $G_b$ in a loop which includes the return line 40. Within that loop, the Buffers 32 are first loaded in a DO loop 42. Then, the changes in quantization error are calculated through the multipliers 30, and the maximum change in error is determined in Block 44 (FIG. 3, Sheet 2). Then, the pointers are modified to effectively transfer the variance which provides the largest change in error to the next bit group $G_b$.

A possible grouping of the variances by the pointers $A_b$ and $B_b$ is illustrated in FIG. 4B. In this illustration, a group of variances including $_1{}^2$ is included in group $G_{bmax}$. This group is defined by addresses $B_{bmax}=q$ and $A_{bmax}=1$. Group $G_4$ is defined by address pointers $B_4=s$ and $A_4=r$. Note that group $G_3$ is empty so $B_3$ and $A_3$ would both equal $-1$. Group $G_2$ incldes a single element, so $B_2$ and $A_2$ both equal t. Group 1 is defined by $B_1=N^2-1$ and $A_1=u$. Group $G_0$ is now empty, so $B_0$ and $A_0$ both equal $-1$.

As the system proceeds through the DO loop 42, it first checks at 46 whether the address of the largest variance of the group being considered is equal to 0. If it is, the ΔE(b) corresponding to a Gaussian distribution is selected by signal 36 (FIG. 2) at block 48 (FIG. 3, Sheet 1). That ΔE(b) is then applied to the buffer 34 associated with $_1{}^2$. Then, at 50 the variance $_1{}^2$ at the address $A_b$ is latched into the associated buffer 32. For any other variance, the ΔE(b) from the usual look-up table selected by signal 28 is used. For each $A_b$ not equal to zero, it is determined whether the address is greater than 0 at 51. If it is less than 0 an empty group is indicated, and a zero is latched into the buffer 32 associated with the group of b bits at 52. If the address is positive, the group includes at least one element, and the largest element is that in the address $A_b$. The variance at $A_b$ is loaded into the associated buffer 32 at 54.

The DO loop 42 is continued until b=bmax−1. The variances included in group bmax are no longer considered in the comparison because no further bits can be assigned to the coefficients in that group. With the variances and the E(b)'s thus loaded in the buffers 32 and 34, the changes in quantization error resulting from assignment of the next bit to the several bit groups are available at $D_0$ to $D_{bmax-1}$. The largest of those inputs is selected at 44 to identify the bit group b* having the variance to which that bit should be assigned.

Selected variances are shifted to next larger bit groups by shifting the addresses $B_b$ and $A_b$ from right to left. The simplest case is where the selected variance is taken from a group which had more than the one variance therein and is moved to a group which already has a variance therein. In that case, as illustrated in a move of a variance from group $G_1$ to group $G_2$, the pointer $A_1$ need only be shifted one element to the left by adding one to its address, and the pointer $B_2$ need only be shifted one to the left by making its address equal to the previous address of $A_1$. These functions are performed in Blocks 56 and 58, respectively.

When the next larger group into which the variance is shifted is empty, as is group $G_3$ in FIG. 4B, the pointer $A_{b^*+1}$ is $-1$, so it can not simply be left as it was; rather, it is given the previous address of $A_{b^*}$ as indicated in Block 60. By thus defining the new $A_{b^*+1}$ and $B_{b^*+1}$ in Blocks 60 and 58, a new group having the single element taken from the address $A_{b^*}$ is created. Thereafter, $A_{b^*}$ may be shifted in block 56 as before.

Another special case is where the selected variance comes from a group having only that variance as a single element. An example is where the variance is taken from group $G_2$ of FIG. 4B. In that case, the group $G_{b^*}$ is eliminated by setting both $A_{b^*}$ and $B_{b^*} = -1$ in block 62.

Figure 5:
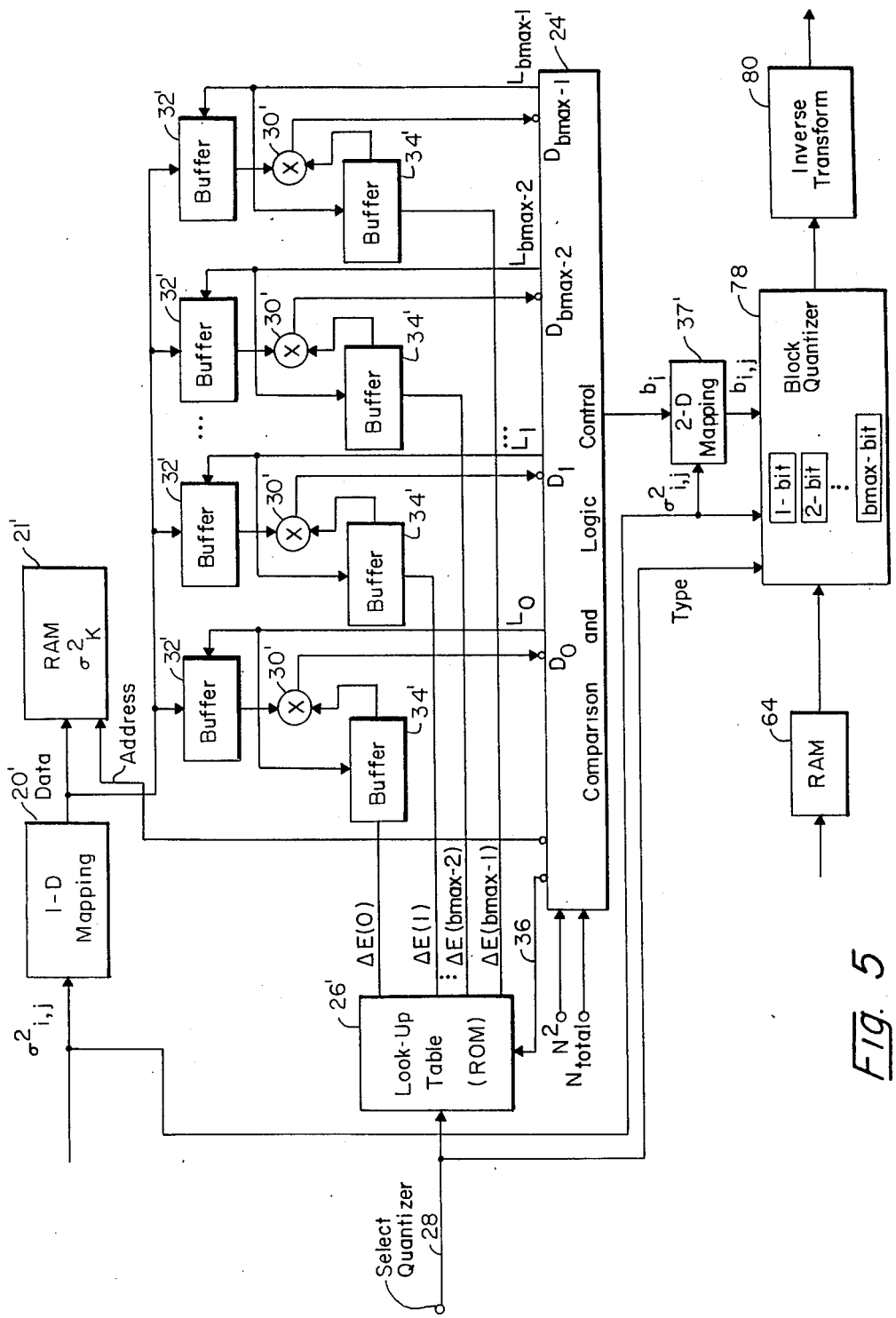
FIG. 5 is a block diagram of a decoder embodying the present invention.

Once NCNT=NTOTAL, the assignment of bits to each coefficient is determined from the group pointers at 63. That assignment is converted to a 2D map at 37 (FIG. 2) to select the appropriate b-bit quantizer 16 for each coefficient. Before transmission of the quantized coefficients, the variances and the signal 28 indicating the type of quantizer and the distribution are transmitted. The signal 28 need only be transmitted once for a sequence of frames and the variances need only be transmitted once for each frame. At the decoder, illustrated in FIG. 5, the quantized coefficients are stored in a random access memory 64 and the bit variances. The computation may be by a system which is identical to that of the coder in that it includes a one dimensional mapping unit 20', an reduction look-up table 26', a RAM 21', buffers 32' and 34', comparison and logic control 24' and a 2-D mapping unit 37'. With the allocation of bits known, the quantized coefficients stored in buffer RAM 64 are applied to an inverse block quantizer 78 to recreate the two dimensional transform coefficients, and those coefficients are then applied to an inverse transform 80 to generate the original image.

While the invention has been particularly shown and described with reference to a preferred embodiment thereof, it is understood by those skilled in the art that various changes in form and details may be made therein without departing from the spirit and scope of the invention as defined by the appended claims.

I claim:

1. A coding system in which discrete coefficients in a frame of blocks of coefficients are quantized with different numbers of quantization bits per coefficient and like numbers of bits for corresponding coefficients in the blocks of the frame, the system comprising, for assigning the quantization bits to the coefficients;

means for ordering the coefficients according to the variance of the coefficients through the frame;

means for grouping the coefficients in bit groups according to the number of bits, if any, already assigned thereto and for regrouping the coefficients as each bit is assigned;

means for determining, for each of a plurality of quantization bits per block, the reduction in quantization error for the frame of blocks with the assignment of a quantization bit to the coefficient of each bit group having the largest variance; and means for comparing the determined reductions in quantization errors and for assigning the next quantization bit to the coefficient for which the largest reduction in quantization error is associated.

2. A coding system as claimed in claim 1 further comprising means for performing a two dimensional transform to provide the discrete coefficients.

3. A coding system as claimed in claim 1 wherein the means for determining the reduction in quantization error computes the product of the variance of a coefficient and a normalized change in quantization error.

4. A coding system as claimed in claim 3 further comprising a lookup table for storing the normalized changes in quantization error.

5. A coding system as claimed in claim 4 further comprising means to select a table of the normalized changes in quantization error based on the type of distribution of the coefficients.

6. A coding system as claimed in claim 3 further comprising means to identify the type of distribution of the coefficients and for then determining the normalized change in quantization error based on that type of distribution.

7. A coding system as claimed in claim 1 further comprising means for transmitting signals indicative of the variances and the type of distribution with the quantized data.

8. A coding system for transform image coding in which discrete coefficients in a frame of two dimensional blocks of coefficients are quantized with different numbers of quantization bits per coefficient and like numbers of bits for corresponding coefficients in the blocks of the frame, the system comprising, for assigning the quantization bits to the coefficients;

means for performing a two dimensional transform to provide the discrete coefficients;

means for ordering the coefficients according to the variance of the coefficients through the frame;

means for grouping the coefficients in bit groups according to the number of bits, if any, already assigned thereto and for regrouping the coefficients as each bit is assigned;

means for providing normalized changes in quantization error as a function of signal distribution;

means for determining, for each of a plurality of quantization bits per block, the reduction in quantization error for the frame of blocks with the assignment of a quantization bit to the coefficient of each bit group having the largest variance by computing the product of the variance of the coefficient and the normalized change in quantization error;

means for comparing the determined reductions in quantization error and for assigning the next quantization bit to the coefficient for which the largest reduction in quantization error is associated; and means for quantizing the coefficient of each block of coefficients with the assigned number of bits.

9. A method of quantizing discrete coefficients in blocks of coefficients with different numbers of quantization bits per coefficient and like numbers of bits per corresponding coefficients in the blocks, the method comprising:

for a frame of a plurality of coefficients, ordering the coefficients according to the variance of the coefficients through the frame;

assigning a number of quantization bits to each of a plurality of coefficients in each block and grouping the coefficients in bit groups according to the number of thus assigned bits, the bits being assigned by determining, for each of a plurality of quantization bits per block, the reduction in quantization error for the frame of blocks with assignment of the quantization bit to the coefficient of each bit group having the largest variance, comparing the determined reductions in quantization errors and assigning the next quantization bit to the coefficient for which the largest reduction in quantization error is associated; and quantizing the coefficients of each block of coefficients with the assigned number of bits.

10. A method as claimed in claim 9 further comprising the step of performing a two-dimensional transform to provide the discrete coefficients.

11. A method as claimed in claim 9 wherein the reduction in quantization error is determined by computing the product of the variance of a coefficient and a normalized change in quantization error.

12. A method as claimed in claim 11 wherein the normalized change in quantization error is retrieved from a lookup table.

13. A method as claim 12 further comprising the step of providing the type of distribution for selecting the normalized change in quantization error from the lookup table.

14. A method as claimed in claim 11 further comprising the step of identifying the type of distribution of the coefficients in order to determine the normalized change in quantization error.

15. A method as claimed in claim 9 further comprising the step of transmitting with the quantized coefficients signals indicative of the variances and type of distribution of the coefficients.

16. A method of assigning a number of quantization bits to each of a plurality of discrete coefficients in blocks of coefficients, the method comprising sequentially assigning the available quantization bits to appropriate coefficients and grouping and regrouping the coefficients in bit groups according to the number of thus assigned bits, the bits being assigned by determining, for each assigned quantization bit, the maximum reduction in quantization error for a frame of blocks of coefficients with assignment of the bit to a predetermined one of the coefficients of each bit group, and assigning the bit to the coefficient, throughout the frame of blocks of coefficients, which provides the greatest reduction in quantization error.

17. A method as claimed in claim 16 further comprising determining the reduction in quantization error from a normalized change in quantization error which is a function of the number of bits already assigned to each coefficient.

18. A method as claimed in claim 17 wherein the normalized change in quantization error is determined as a function of the type of distribution of the coefficients.

19. A method as claimed in 18 wherein the change in quantization error is computed as the product of the variance and the normalized change in quantization error for the coefficient having the largest variance within each group of coefficients having a particular number of bits already assigned thereto.

20. A method as claimed in claim 16 wherein the predetermined one of the coefficients of each bit group is the coefficient having the largest variance.

* * * * *